United States Patent
Ueda (10) Patent No.: US 10,843,627 B2
(45) Date of Patent: Nov. 24, 2020

(54) AUTOMATED DRIVE SYSTEM DETERMINING ABNORMALITIES IN LIGHTING OPERATION OF HEADLIGHTS OF A VEHICLE

(71) Applicant: Toyota Jidosha Kabushiki Kaisha, Toyota (JP)

(72) Inventor: Kazuhiko Ueda, Chofu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/681,188

(22) Filed: Nov. 12, 2019

(65) Prior Publication Data

US 2020/0148109 A1 May 14, 2020

(30) Foreign Application Priority Data

Nov. 14, 2018 (JP) ................................ 2018-213959

(51) Int. Cl.
*B60Q 11/00* (2006.01)
*B60W 50/14* (2020.01)
*B60Q 1/04* (2006.01)

(52) U.S. Cl.
CPC ............. *B60Q 11/005* (2013.01); *B60Q 1/04* (2013.01); *B60W 50/14* (2013.01)

(58) Field of Classification Search
CPC combination set(s) only.
See application file for complete search history.

(56) References Cited

U.S. PATENT DOCUMENTS

| 5,828,298 A * | 10/1998 | Eagan ................. B60Q 11/005 340/458 |
| 2015/0343951 A1* | 12/2015 | Kim .................... B60G 17/0195 701/42 |
| 2017/0300766 A1* | 10/2017 | Kang ..................... B60Q 1/0023 |
| 2017/0305344 A1* | 10/2017 | Okumichi ................ G06T 5/20 |
| 2019/0064811 A1* | 2/2019 | Du ......................... G01S 13/931 |
| 2019/0359131 A1* | 11/2019 | Wama .................. B60Q 1/0023 |

FOREIGN PATENT DOCUMENTS

| JP | 2018-036722 A | 3/2018 |
| JP | 2018-132533 A | 8/2018 |

* cited by examiner

*Primary Examiner* — Andrew W Bee
(74) *Attorney, Agent, or Firm* — Dinsmore & Shohl LLP (57) ABSTRACT

An automated drive system comprises a first and a second system. The first system comprises a camera and an ADS-ECU (a first controller). The camera is configured to acquire front information of a vehicle. The first controller is configured to execute automated driving control of the vehicle. The first controller is configured to judge whether or not headlights are lighted based on the front information. The second system comprises a BODY-ECU (a second controller). The second controller is configured to control lighting operation of the headlights. The second controller is configured to transmit to the first controller an ACK signal about control status of the lighting operation. The first controller is configured to judge whether or not an abnormality has occurred in the second system based on judgement result signal based on the front information and the ACK signal.

3 Claims, 5 Drawing Sheets

ABNORMALITY JUDGEMENT PROCESSING
S10: ESTIMATE FIRST LIGHTING STATE OF HEADLIGHTS BASED ON FIRST LIGHTING INFORMATION
S12: ESTIMATE SECOND LIGHTING STATE OF HEADLIGHTS BASED ON SECOND LIGHTING INFORMATION
S14: DO FIRST AND SECOND LIGHTING STATES CONFLICT WITH EACH OTHER?
S16: JUDGE THAT ABNORMALITY HAS OCCURRED IN SECOND SYSTEM
S18: JUDGE THAT SECOND SYSTEM IS NORMAL

FIG. 5

IDENTIFYING PROCESSING
S20: IS FIRST LIGHTING STATE ESTIMATED "OFF" & IS SECOND LIGHTING STATE ESTIMATED "ON" ?
S22: OUTPUT SWITCHING INFORMATION
S24: IS SW POSITION AT POSITION "HEAD"?
S26: ESTIMATE FIRST LIGHTING STATE OF HEADLIGHTS BASED ON FIRST LIGHTING INFORMATION
S28: IS FIRST LIGHTING STATE ESTIMATED TO BE "ON"?
S30: JUDGE THAT BODY-ECU 70 OR CONNECTING LINE 82 HAS FAILED
S32: JUDGE THAT HEADLIGHTS 80 OR CONNECTING LINE 84 HAS FAILED

*FIG. 6*

AUTOMATED DRIVE SYSTEM DETERMINING ABNORMALITIES IN LIGHTING OPERATION OF HEADLIGHTS OF A VEHICLE

CROSS-REFERENCE TO RELATED APPLICATION

The present disclosure claims priority under 35 U.S.C. § 119 to Japanese Patent Application No. 2018-213959, filed on Nov. 14, 2018. The content of the application is incorporated herein by reference in their entirety.

TECHNICAL FIELD

The present disclosure relates to an automated drive system.

BACKGROUND

JP2018-132533A discloses an automated drive system in which automated driving control for a vehicle is executed. The automated drive system is configured to be accessible to a mobile terminal of a driver of the vehicle. When interrupting the automated driving control, the automated drive system transmits warning information to the mobile terminal prompting the driver to switch to manual driving. The warning information is displayed on the mobile terminal. Therefore, even if the driver operates the mobile terminal during the automated driving control, it is possible for the driver to notice the warning information, slide a glance at front of the vehicle and start the manual driving.

The vehicle is usually equipped with a lighting system of headlights. Then, consider a case where this lighting system is combined with automated drive system. When an abnormality occurs in the lighting system, the headlights do not work, and thus, when surroundings of the vehicle become dark, it becomes difficult to secure visibility in front of the vehicle by the automated drive system. Thus, in this instance, it is expected that the automated drive system will transmit the warning information.

However, when the headlights do not work, the surroundings of the vehicle remains dark. Therefore, even if the driver notices the warning information, the driver does not always start the manual driving. Therefore, it is desirable that an occurrence of the abnormality in the lighting system combined with the automated drive system is detected early.

The present disclosure addresses the above described problem, and an object of the present disclosure is, to provide a technique capable of early detecting the occurrence of the abnormality in the lighting system of the headlights combined with the automated drive system.

SUMMARY

A first aspect is an automated drive system.

The automated drive system comprises a first system and a second system.

The first system is configured to execute automated driving control of a vehicle.

The second system is configure to control lighting operation of headlights of the vehicle.

The first system comprises a camera and a first controller.

The camera is configured to acquire front information of the vehicle.

The first controller is configured to acquire first lighting information of the headlights based on the front information.

The second system comprises a second controller.

The second controller is configured to output second lighting information of the headlights to the first controller.

The first controller is further configured to execute abnormality judgement processing of the second system based on the first and second lighting information.

In the abnormality judgement processing, the first controller is configured to: estimate a first lighting state of the headlights based on the first lighting information; estimate a second lighting state of the headlights based on the second lighting information; and if the first lighting state differs from the second lighting state, judge that an abnormality has occurred in the second system.

A second aspect further has the following features in the first aspect.

The first system further comprises a user interface.

The user interface is configured to provide predetermined data to a driver of the vehicle.

The second system further comprises a switch of the headlights and a direct connecting line.

The direct connecting line is configured to connect the headlights and the headlight switch directly while diverting the second controller.

The first controller is further configured to, when it is estimated that the first lighting state is off and the second lighting state is on, output switching information to the user interface for urging the driver to switch a connection point of the switch from the second controller to the direct connecting line.

The first controller is further configured to, after outputting the switching information, execute identifying processing to identify an abnormal cause of the second system based on the first lighting state.

In the identifying processing, the first controller is configured to identify that the second controller has failed or a connecting line connecting the second controller with the headlights has failed when the first lighting state is on.

A third aspect further has the following features in the first aspect.

The first system further comprises a user interface.

The user interface is configured to provide predetermined data to a driver of the vehicle.

The second system further comprises a switch of the headlights and a direct connecting line.

The direct connecting line is configured to connect the headlights and the headlight switch directly while diverting the second controller.

The first controller is further configured to, when it is estimated that the first lighting state is off and the second lighting state is on, output switching information to the user interface for urging the driver to switch a connection point of the switch from the second controller to the direct connecting line.

The first controller is further configured to, after outputting the switching information, execute identifying processing to identify an abnormal cause of the second system based on the first lighting state.

In the identifying processing, the first controller is configured to identify that the headlights has failed or the direct connecting line has failed when the first lighting state is off.

According to the first aspect, in the first system where the automated driving control is executed, the abnormality judgement processing is also executed based on the first and second lighting states. In the abnormality judgement processing, when the first and second lighting states differ from each other, it is judged that an abnormality has occurred in the second system for controlling lighting operation of the headlights. Therefore, in the automated drive system including the first and the second system, it is possible to detect an occurrence of the abnormality in the second system at an early stage.

According to the second or third aspect, after outputting the switching information, the identifying processing of the abnormal cause in the second system is executed based on the first lighting state. And, in the identifying processing, when the first lighting state is on, it is identified that the second controller has failed or the connecting line connecting the second controller and the headlights has failed. On the other hand, in the identifying processing, if the first lighting state is off, it is judged that the headlights has failed or the direct connecting line has failed. From the above, it is possible to identify the cause of the abnormality in the second system.

DETAILED DESCRIPTION

An embodiment of the present disclosure will be described with reference to drawings. In the drawings, parts identical or equivalent to each other are denoted by an identical reference sign, and duplicate description thereof will be simplified or omitted.

1. Entire Configuration of Automated Drive System

Figure 1:
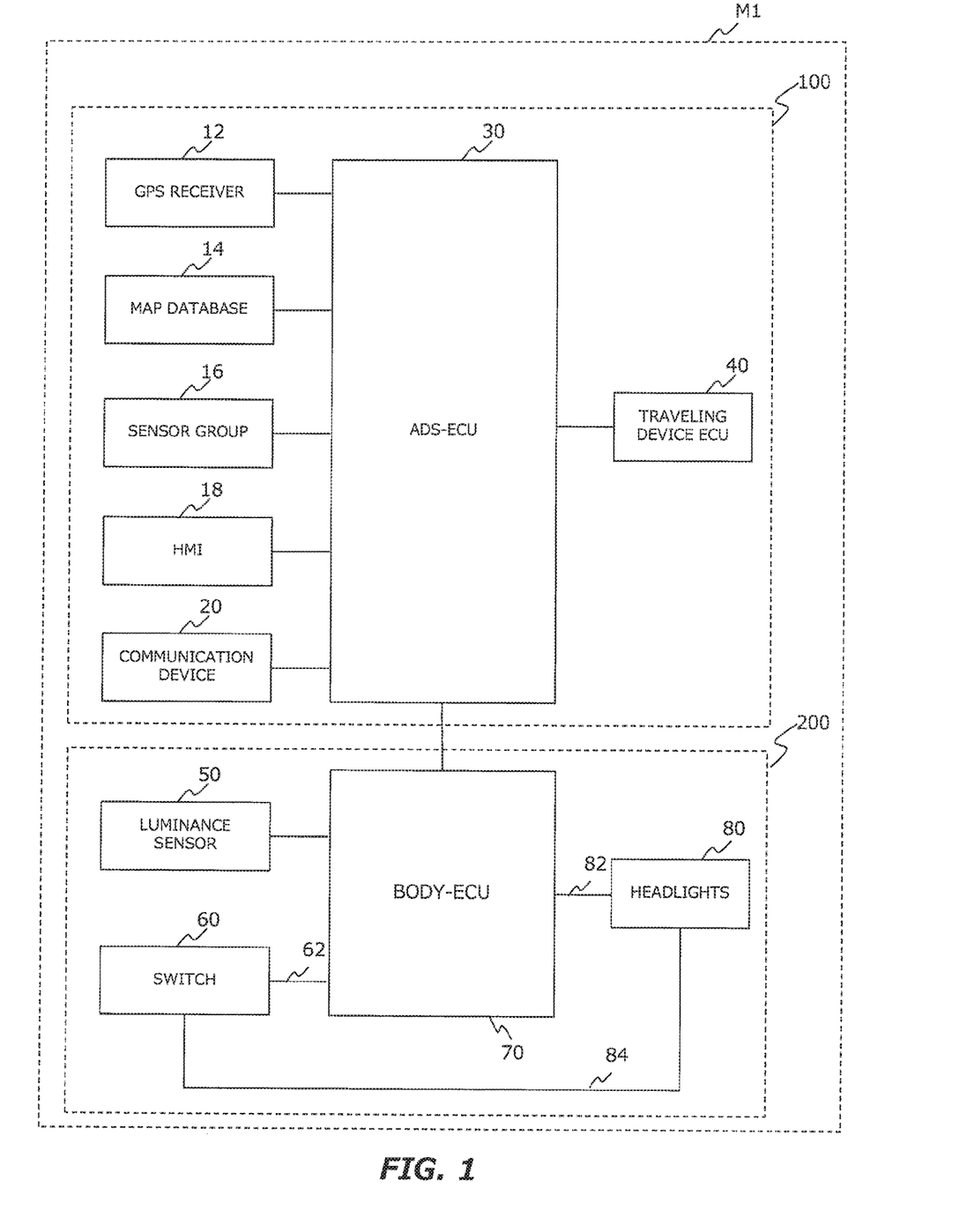
FIG. 1 is a diagram for showing a configuration example of an automated drive system according to an embodiment of the present disclosure.

FIG. 1 is a diagram for showing a configuration example of an automated drive system according to the embodiment of the present disclosure. The automated drive system is mounted on a vehicle. Hereinafter, the vehicle on which the automated drive system is mounted is also referred to as a "vehicle M1". Examples of the vehicle M1 include a vehicle in which an internal combustion engine is mounted as a power source, an electronic vehicle in which an electric motor is mounted as the power source, and a hybrid vehicle including the internal combustion engine and the electric motor. The electric motor is driven by a battery such as a secondary battery, a hydrogen fuel cell, a metal fuel cell, an alcohol fuel cell, or the like.

1.1 First System

The automated drive system comprises a first system 100. The first system 100 is a system for executing automated driving control of the vehicle M1. The first system 100 includes a GPS (Global Positioning System) receiver 12, a map database 14, a sensor group 16, an HMI (Human Machine Interface) unit 18, a communication device 20, an electronic control unit (hereinafter also referred to as an "ADS-ECU") 30 for the automated driving control, and an electronic control unit (hereinafter also referred to as a "traveling device ECU") 40 for traveling devices.

The GPS receiver 12 is a device that receives signals from at least three GPS satellites. The GPS receiver 12 calculates position and orientation of the vehicle M1 based on the received signals. The GPS receiver 12 transmits the calculated data to the ADS-ECU 30.

The map database 14 stores map information data. The map information data includes data on positions such as roads or intersections, data on shapes of roads (e.g., types of curves or straight lines, width of roads, or gradient of roads), and data on types of roads (e.g., highways, toll roads or open roads). The map database 14 is stored in a predetermined storage device such as a hard disk or a flash memory.

The sensor group 16 includes an external sensor for detecting surrounding conditions of the vehicle M1 and an internal sensor for detecting a traveling condition of the vehicle M1.

Examples of the external sensor include a LIDAR (Laser Imaging Detection and Ranging), a radar, and a camera. The LIDAR uses light to detect landmarks around the vehicle M1. The radar uses radio waves to detect the landmarks around the vehicle M1. The camera takes an image of surrounding conditions of the vehicle M1. The camera is installed, for example, on a back side of a windshield near a room mirror. The external sensor transmits the detected data to the ADS-ECU 30. The detected data includes image data in front of the vehicle M1 captured by the camera.

Examples of the internal sensor include a vehicle speed sensor, a brake sensor, an accelerator position sensor, and a steering angle sensor. The vehicle speed sensor detects traveling speed of the vehicle M1. The brake sensor detects a manipulated amount of a brake pedal by the driver of the vehicle M1. The accelerator position sensor detects a manipulated amount of an accelerator pedal by the driver. The steering angle sensor detects rotation angle (steering angle) of a steering wheel. The internal sensor transmits the detected data to the ADS-ECU 30.

The HMI unit 18 is a user interface for providing information to the driver and accepting information from the driver. The HMI unit 18 includes an input device, a display device, a speaker and a microphone. Examples of the input device include a touch panel, a keyboard, a switch, and a button. The information provided to the drivers includes information about traveling conditions of the vehicle M1, predetermined warnings, and a suggestion for switching from automated driving to manual driving. The information provided to the driver is output from the display device and the speaker. The information input from the driver is accepted by the input device and the microphone. The HMI unit 18 transmits data input from the drivers to the ADS-ECU 30.

The communication device 20 performs V2X communication (Vehicle-to-Vehicle communication and Vehicle-to-Infrastructure communication). Specifically, the communication device 20 performs V2V communication (Vehicle-to-Vehicle communication) with other vehicles. In addition, the communication device 20 performs V2I communication (Vehicle-to-infrastructure communication) with surrounding infrastructures. Through the V2X communication, the communication device 20 is able to obtain information about environments of the vehicle M1. The communication device 20 transmits the acquired information to the ADS-ECU 30.

The ADS-ECU 30 executes the automated driving control for controlling the automated driving of the vehicle M1. Typically, the ADS-ECU 30 is a microcomputer including a processor, memories, and an input and output interfaces. The ADS-ECU 30 receives various information from the input and output interfaces. And, the ADS-ECU 30 executes the automated driving control based on the received information. Specifically, the ADS-ECU 30 calculates a travel plan of the vehicle M1 and outputs information to the traveling device ECU 40 such that the vehicle M1 travels in accordance with the travel plan.

The traveling device ECU 40 is a microcomputer having the same configuration as the ADS-ECU 30. The traveling device ECU 40 includes a plurality of ECUs. Each of these ECUs controls various types of traveling devices (not shown) for automatically driving of the vehicle M1 in accordance with various information input from the ADS-ECU 30. The traveling devices include a driving force output device, a steering device and a brake device. The driving force output device is a power source for generating a driving force. The steering device steers wheels. The brake device generates a braking force.

A known technique is applied to the automated driving control executed by the ADS-ECU 30. Therefore, descriptions of functions of the ADS-ECU 30 related to the automated driving control are omitted. Functions related to features of the present embodiment will be described later.

1.2 Second System

The automated drive system further comprises a second system 200. The second system 200 is a system for controlling a lighting operation of headlights. The second system 200 is connected to the first system 100. The second system 200 includes a luminance sensor 50, a switch (i.e., a headlight switch) 60, a lighting operation control electronic control unit (hereinafter referred to as a "BODY-ECU") 70, and headlights 80.

The switch 60 is connected to the BODY-ECU 70 via a connecting line 62. The headlights 80 are connected to the BODY-ECU 70 via a connecting line 82. That is, the switch 60 and the headlights 80 are connected to each other via the connecting lines 62 and 82 and the BODY-ECU 70. The switch 60 and the headlights 80 are further connected via a connecting line 84. The connecting line 84 is a direct connecting line that diverts the BODY-ECU 70. When the switch 60 and the headlights 80 are connected to each other through the connecting line 84, the headlights 80 are constantly turned on.

The luminance sensor 50 detects luminance at a position of the vehicle M1. The luminance sensor 50 is installed, for example, on the back side of the windshield near the room mirror. The luminance sensor 50 transmits the detected information (hereinafter also referred to as "luminance information") to the BODY-ECU 70. The luminance sensor 50 may transmit the luminance information to the ADS-ECU 30 as well as the BODY-ECU 70. In this case, the luminance information is transmitted to the ADS-ECU 30 as one of the detected information from the external sensor.

Figure 2:
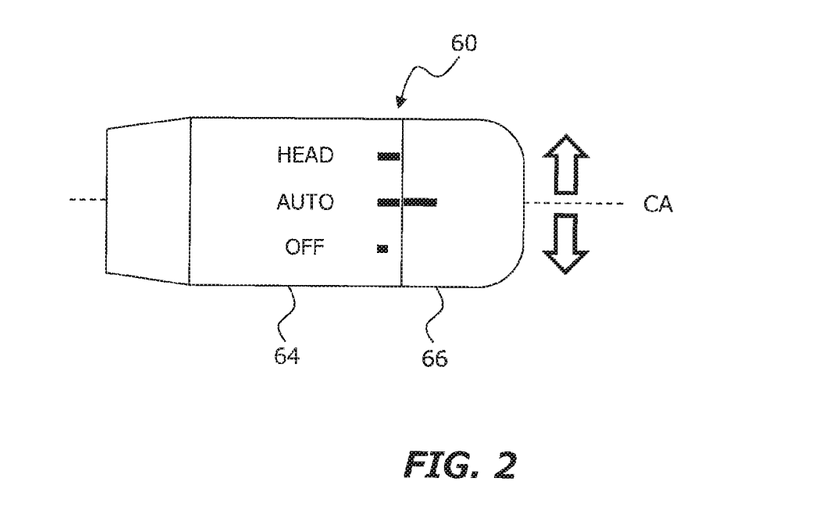
FIG. 2 is a schematic diagram for showing a first configuration example of a headlight switch.

The switch 60 is a device for operating the headlights 80. FIG. 2 is a schematic diagram for showing a first configuration example of the switch 60. The switch 60 shown in FIG. 2 includes a main body portion 64 and a grip portion 66. The grip portion 66 is provided at a distal end of the main body portion 64. The grip portion 66 is supported so as to rotate around a central axis CA of the switch 60.

The main body portion 64 has a position at which the grip portion 66 stops rotating (hereinafter also referred to as a "SW position"). The number of the SW position is three. The position shown as "AUTO", "HEAD" and "OFF" in FIG. 2 corresponds to the SW position. When the SW position is at the position "AUTO" or "HEAD", an ON signal corresponding to the SW position is transmitted from the switch 60 to the BODY-ECU 70. On the other hand, when the SW position is in the position "OFF", an OFF signal is transmitted. The ON or OFF signal is transmitted via the connecting line 62 shown in FIG. 1.

During the travel of the vehicle M1, the SW position is essentially at the position "AUTO". The change from the position "AUTO" to the position "HEAD" or "OFF" is made by a manual operation of the grip portion 66. If the SW position is manually changed from the position "AUTO" to the position "HEAD" while the vehicle M1 is traveling, the SW position stops at the position "HEAD". Here, when the SW position is at the position "HEAD", the switch 60 and the headlights 80 are directly connected to each other through the connecting line 84 shown in FIG. 1. Therefore, the headlights 80 are constantly turned on.

On the other hand, the SW position cannot be stopped at the position "OFF" while the vehicle M1 is traveling. In other words, even if the SW position is manually changed to the position "OFF", the SW position returns to the position "AUTO" after the driver hands off the grip portion 66. In other words, the change to the position "OFF" is prohibited in principle while the vehicle M1 is traveling (i.e., momentary operation). Only when the vehicle M1 is stopped, the SW position is stopped at the position "OFF".

Figure 3:
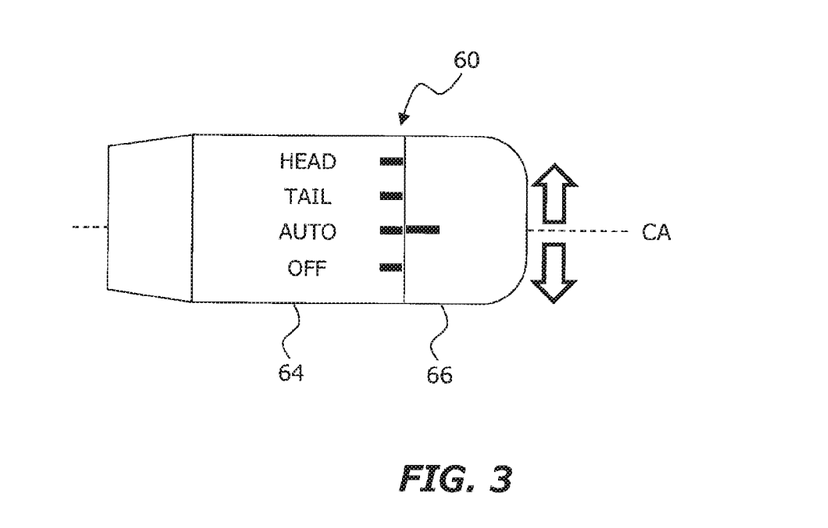
FIG. 3 is a schematic diagram for showing a second configuration example of the headlight switch.

FIG. 3 is a schematic diagram for showing a second configuration example of the switch 60. The second configuration example is basically the same as the first configuration example. Unlike the first configuration example, in the second configuration example, a "TAIL" position is added to the SW position. The second configuration example is applied to the vehicle M1 where the lighting operation of taillights and position lamps are executed simultaneously with that of the headlights 80. In the second configuration example, when the SW position is at the position "AUTO", "HEAD" or "TAIL", the ON signal is transmitted from the switch 60 to the BODY-ECU 70.

The BODY-ECU 70 controls the lighting operation of the headlights 80 based on the input signals from the switch 60 and the luminance information. When the ON signal is input from the switch 60 and the luminance is less than a first reference value, the BODY-ECU 70 turns on the headlights 80. When the luminance is equal to or greater than the first reference value, or when the OFF signal is input from the switch 60, the BODY-ECU 70 turns off the headlights 80.

Under legal requirements, the BODY-ECU 70 controls the lighting operation of the headlights 80 based only on the input signals from the switch 60. The BODY-ECU 70 turns on the headlights 80 when the ON signal is input. When the OFF signal is input, the BODY-ECU 70 turns off the headlights 80.

The BODY-ECU 70 transmits a self-diagnostic signal (hereinafter also referred to as a "diagnosis signal") to the ADS-ECU 30. The diagnosis signal is a signal with respect to failures in the second system 200. The diagnosis signal includes code for notifying a normal state of the system or code for notifying an abnormal state of the system. When the diagnosis signal includes the code for notifying of the abnormal state, the automated driving control by the ADS-ECU 30 is not executed. The automated driving control is executed only when it is judged from the diagnosis signal that the headlights 80 is ready to light.

During the execution of the automated driving control, the BODY-ECU 70 receives a signal for automatic lighting mode from the ADS-ECU 30. When receiving the signal for automatic lighting mode, the BODY-ECU 70 controls the lighting operation of the headlights 80 based on the luminance information, regardless of contents in the signals from the switch 60. Under legal requirements, the BODY-ECU 70 controls the lighting operation of the headlights regardless of the luminance information. In other words, during the automated driving control, the lighting operation is controlled regardless of the SW position.

While receiving the signal for automatic lighting mode, the BODY-ECU 70 transmits an ACK signal (Acknowledgement signal) with respect to control status of the lighting operation to the ADS-ECU 30. The ACK signal contains first, second or third code. The first code is code for notifying that control of the lighting operation is under execution and the headlights 80 are turned on. The second code is code for notifying that the luminance is greater than or equal to the first reference value and the headlights 80 are turned off, although the control of the lighting operation is under execution. The third code is code for notifying that the control of the lighting operation is not under execution.

2. Features in Present Embodiment

Figure 4:
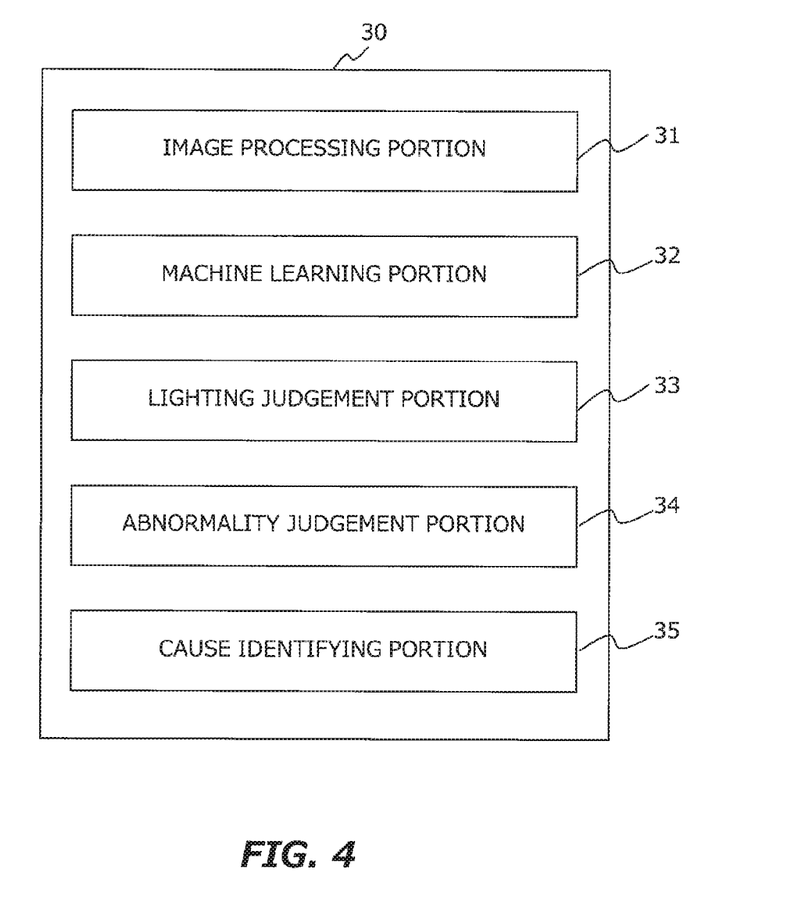
FIG. 4 is a diagram for showing functional configuration example of an ADS-ECU.

While the ADS-ECU 30 receives the ACK signal containing the first code, the headlights 80 are assumed to be turned on. However, it is assumed that the headlights 80 are actually turned off for some reason. It is also assumed that the headlights 80 are turned on even though the ADS-ECU 30 receives the ACK signal including the second code. In order to detect such abnormal states, in the present embodiment, the ADS-ECU 30 is configured as follows.
2.1 Configuration of ADS-ECU FIG. 4 is a block diagram for showing a functional configuration example of the ADS-ECU 30. As shown in FIG. 4, the ADS-ECU 30 includes an image processing portion 31, a machine learning portion 32, a lighting judgement portion 33, an abnormality judgement portion 34, and a cause identifying portion 35.

The image processing portion 31 processes the image data in front of the vehicle M1 taken by the camera. In the image processing, data indicating a region correlated with the lighting state of the headlights 80 is selectively extracted from the image data in front of the vehicle M1. Examples of the region correlated with the lighting state include an illumination region of the headlights 80. The illumination region has a predetermined region set with reference to position of optical axes of the headlights 80.

The image processing portion 31 transmits the extracted image data to the machine learning portion 32 and the lighting judgement portion 33.

Prior to extracting the image data, the image processing portion 31 may select appropriate image data to be learned by the machine learning portion 32. The appropriate image data is selected, for example, based on weather data around the vehicle M1 and traveling area of the vehicle M1. The image data obtained under clear weather and the image data obtained during the vehicle travels in a suburban area or on the highway are appropriate for learning because surrounding luminance during data collection is stable. On the contrary, the image data obtained under rainy weather or the image data obtained during the vehicle travels in urban area is not appropriate for learning because noises are superimposed on the image data.

The machine learning portion 32 automatically learns characteristic quantity of the image data when the headlights 80 are turned on based on pattern of the image data received from the image processing portion 31. The machine learning portion 32 generates a judgement model based on the features obtained through learning, and transmits this judgement model to the lighting judgement portion 33. The judgement model may be transmitted as it is generated, or may be transmitted periodically. When the judgement model is transmitted periodically, the most recent one may be selected every transmission.

The lighting judgement portion 33 judges whether or not the headlights 80 are lighted based on the image data received from the image processing portion 31 and the judgement model received from the machine learning portion 32. The lighting judgement portion 33 transmits a judgement result signal to the abnormality judgement portion 34 and the cause identifying portion 35. If it is judged that the headlights 80 are lighted, the judgement result signal includes code indicating "ON". If it is judged that the headlights 80 are not lighted, the judgement result signal includes code indicating "OFF". The learning of the characteristic quantity executed by the machine learning portion 32 and the judgement executed by the lighting judgement portion 33 may be realized with deep learning.

The abnormality judgement portion 34 judges whether or not an abnormality has occurred in the second system 200 based on the judgement result signal received from the lighting judgement portion 33 and the ACK signal. The abnormality judgement portion 34 estimates a first lighting state of the headlights 80 based on the code contained in the judgement result signal. The abnormality judgement portion 34 also estimates a second lighting state of the headlights 80 based on the code contained in the ACK signal. The abnormality judgement portion 34 judges whether or not the abnormality has occurred in the second system 200 by comparing the first lighting state with the second lighting state. A series of processing (i.e., abnormality judgement processing) will be described later in detail.

Figure 5:
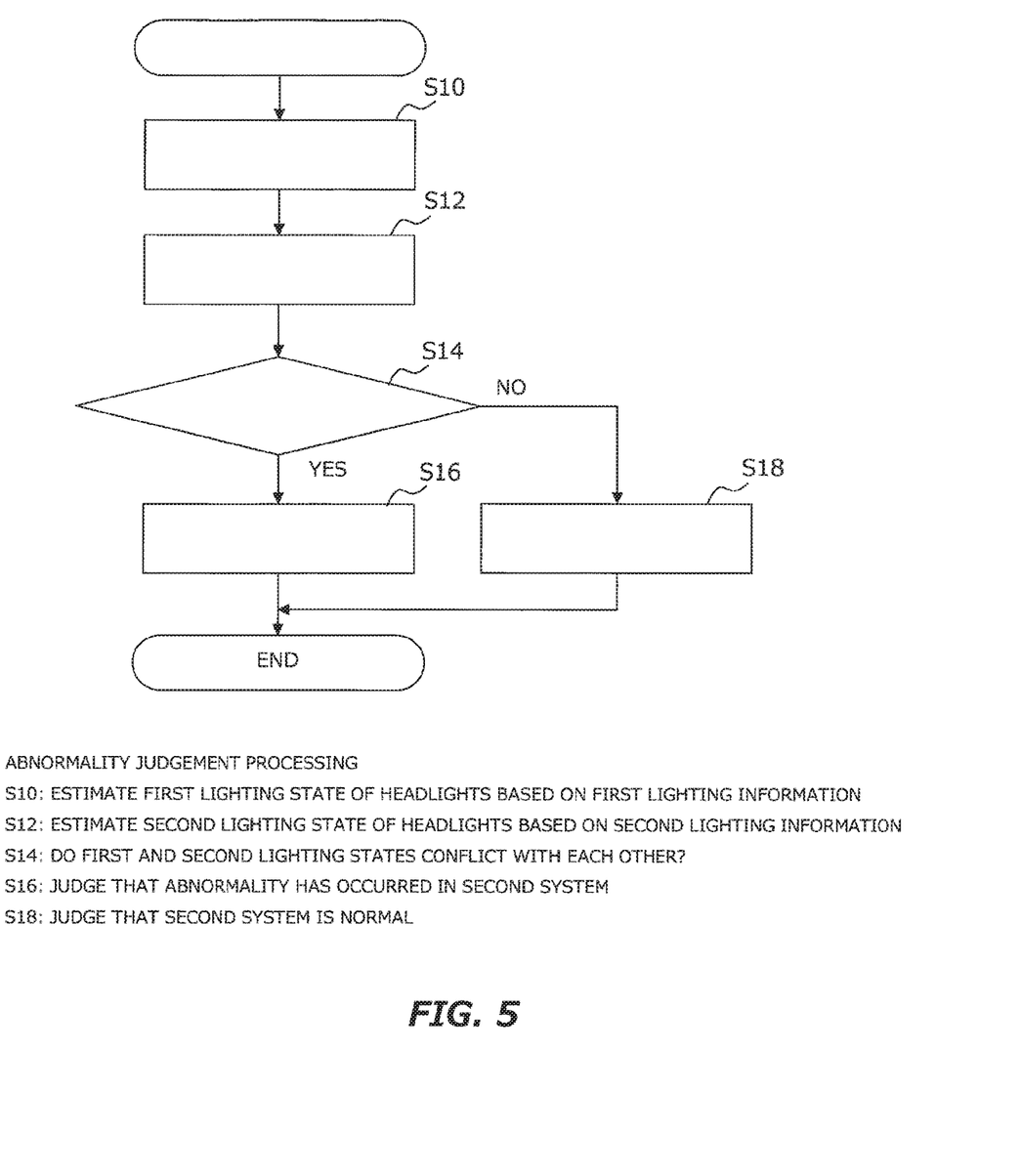
FIG. 5 is a flow chart for explaining flow of abnormality judgement processing.

When the abnormality judgement portion 34 judges that the abnormality has occurred in the second system 200, then the cause identifying portion 35 identifies a cause of the abnormality. The cause identifying portion 35 outputs switching information to the HMI unit 18 to prompt the driver to switch the grip portion 66 (specifically, to switch the SW position to the position "HEAD"). After outputting the switching information, the cause identifying portion 35 identifies a location where the abnormality has occurred based on the judgement result signal received from the lighting judgement portion 33. A series of processing (i.e., identifying processing) will be described later in detail.
2.2 Abnormality Judgement Processing FIG. 5 is a flow chart for explaining the flow of abnormality judgement processing. The routine shown in FIG. 5 is executed, for example, when the following conditions are satisfied. The following conditions are exemplary environmental conditions suitable for executing the abnormality judgement processing.
(i) The luminance is less than a second reference value (< the first reference value)
(ii) The vehicle speed is less than a predetermined speed
(iii) The steering angle is less than predetermined angle
(iv) It is not under bad weather In the abnormality judgement processing, first, the first lighting state of the headlights 80 is estimated based on the first lighting information (step S10). The first lighting state is estimated based on the code contained in the judgement result signal. Therefore, when the judgement result signal includes the code indicating "ON", the first lighting state is estimated to be "ON". When the judgement result signal contains the code indicating "OFF", the first lighting state is estimated to be "OFF".

Subsequent to the step S10, the second lighting state of the headlights 80 is estimated based on the second lighting information (step S12). The second lighting state is estimated based on the code contained in the ACK signal. According to the first, second or third code described above, if the ACK signal contains first code, the second lighting state is estimated to be "ON". On the other hand, when the second or third code is contained in the ACK signal, the second lighting state is estimated to be "OFF".

Subsequent to the step S12, it is judged whether or not the first and the second lighting states conflict with each other (step S14). If both first and second lighting states are estimated to be "ON", the two both states are judged to be consistent. On the other hand, if the first lighting state is estimated to be "OFF" while the second lighting state is estimated to be "ON", the two states are judged to be contradictory. In other words, when the first and the second lighting states differ from each other, the two states are judged to be contradictory.

If the judgement result in the step S14 is positive, it is judged that the abnormality has occurred in the second system 200 (step S16). On the other hand, if the judgement result in the step S14 is negative, it is judged that the second system 200 is normal (step S18).

2.3 Identifying Processing

Figure 6:
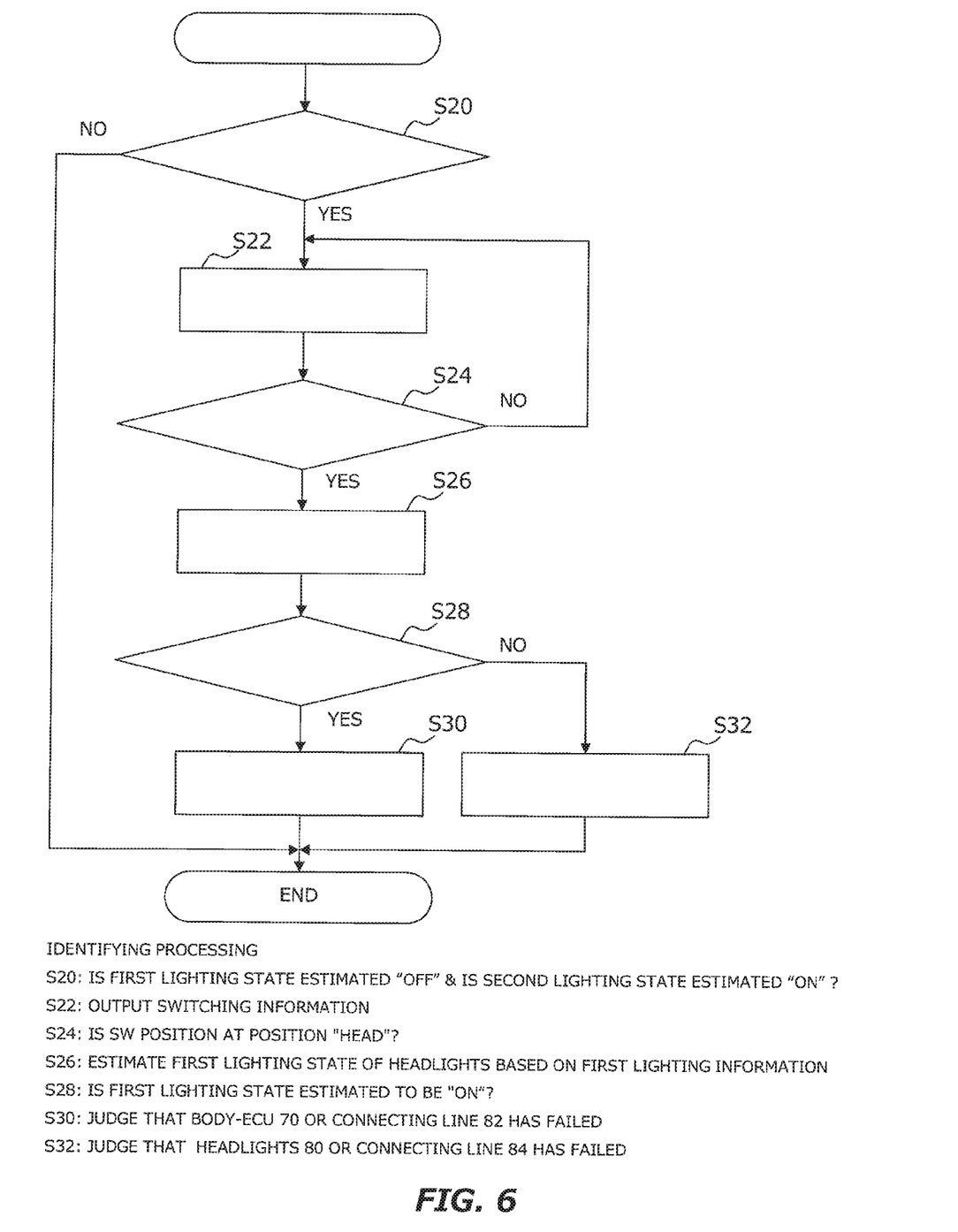
FIG. 6 is a flow chart for explaining flow of identifying processing.

FIG. 6 is a flow chart for explaining a flow of the identifying processing. The routine shown in FIG. 6 is executed, for example, following the processing of the step S16 shown in FIG. 5.

In the routine shown in FIG. 6, it is first judged whether or not the first lighting state is estimated to be "OFF" while the second lighting state is estimated to be "ON" (step S20). The content of the processing in the step S20 is basically the same as that in the step S14 shown in FIG. 5. If the judgement result in the step S20 is negative, the identifying processing is ended.

If the judgement result in the step S20 is positive, the switching information is output (step S22). The switching information is a warning that urges the drivers to manual operation of the grip portion 66. The switching information is output to the HMI unit 18. When the switching information is output, an external schematic view of the switch 60 and a direction of the manual operation are output from the display device. When the switching information is output, an alarm is output from the speaker.

Subsequent to the step S22, it is judged whether or not the SW position is at the position "HEAD" (step S24). As described above, when the SW position is in the position "HEAD", the switch 60 and the headlights 80 are connected to each other through the connecting line 84, and the headlights 80 are constantly turned on. The judgement processing in the step S24 is executed based on the ON signal output when the SW position is at the position "HEAD". If the judgement result of the step S24 is negative, the processing of the step S22 is executed again.

If the judgement result in the step S24 is positive, the first lighting state of the headlights 80 is estimated based on the first lighting information (step S26). The processing of the step S26 is the same as that of the step 10 shown in FIG. 5. As described in the processing of the step S10, when the code indicating "ON" is contained in the judgement result signal, the first lighting state is estimated to be "ON". If the judgement result signal contains the code indicating "OFF", the first lighting state is estimated to be "OFF".

Subsequent to the step S26, it is judged whether or not the first lighting state is estimated to be "ON" (step S28). If the judgement result in the step S28 is positive, the processing of the step S30 is executed. If the judgement result in step S28 is negative, the processing of the step S32 is executed.

In the step S30, it is judged that the BODY-ECU 70 or the connecting line 82 has failed. In the step S32, it is judged that the headlights 80 or the connecting line 84 has failed. When the SW position is in the position "HEAD", the headlights 80 should be illuminated at all times. Therefore, if the headlights 80 are not turned on even though the SW position is switched, it can be judged that there is a cause of the abnormality in a direct connecting system (step S32). Otherwise, it can be judged that there is the cause of the abnormality at a location other than the direct connecting system (step S30).

3. Advantageous Effect

According to the present embodiment, it is possible to detect that the abnormality has occurred in the second system 200 at an early stage through the abnormality judgement processing. Therefore, even though the surroundings of the vehicle M1 is dark, it is possible to avoid in advance performing a hand-over from the automated driving executed by the first system 100 to the manual driving. Further, according to the present embodiment, it is possible to identify the cause of the abnormality in the second system 200 through the identifying processing. Therefore, it is possible to take measures in accordance with the identified cause at an early stage.

4. Correspondence Between Embodiment and Aspects

In the above embodiment, the ADS-ECU 30 corresponds to the "first controller" of the first aspect. The BODY-ECU 70 corresponds to the "second controller" of the first aspect. The HMI unit 18 corresponds to the "user interface" of the second or third aspect. The connecting line 84 corresponds to the "direct connecting line" of the second or third aspect.

5. Other Embodiment

In the above embodiment, the second lighting state was estimated based on the first, second or third code contained in the ACK signal received by the ADS-ECU 30 when the automated driving control is executed. However, the estimation of the second lighting state may be executed when the automated driving control is not executed (e.g., when the manual driving is executed). For example, the BODY-ECU 70 is configured to transmit signals including code corresponding to the first, second or third code to the ADS-ECU 30 when the ON signal is received from the switch 60. As a result, even when the automated driving control is not executed, it is possible to detect whether or not the abnormality has occurred in the second system 200.

When numerical values such as the number, quantity, amount, range, and the like of each element are described above in the embodiment, the embodiment in the present disclosure is not limited to the numerical values unless explicitly stated or the numerical values are clearly specified in principle. Moreover, structures or the like described in the embodiment are not necessarily essential to the embodiment in the present disclosure unless explicitly stated or the structures or the like are clearly specified in principle.

What is claimed is:
1. An automated drive system comprising:
a first system which is configured to execute automated driving control of a vehicle; and
a second system which is configured to control lighting operation of headlights of the vehicle, wherein the first system comprises:
  a camera which is configured to acquire front information of the vehicle;
  a user interface which is configured to provide predetermined data to a driver of the vehicle; and
  a first controller which is configured to acquire first lighting information of the headlights based on the front information,
wherein the second system comprises:
  a second controller which is configured to output second lighting information of the headlights to the first controller, and
  a switch of the headlights, and a direct connecting line which is configured to connect the headlights and the headlight switch directly while diverting the second controller,
wherein the first controller is further configured to execute abnormality judgement processing of the second system based on the first and second lighting information,
wherein, in the abnormality judgement processing, the first controller is configured to:
  estimate a first lighting state of the headlights based on the first lighting information;
  estimate a second lighting state of the headlights based on the second lighting information; and
  if the first lighting state differs from the second lighting state, judge that an abnormality has occurred in the second system, and
wherein the first controller is further configured to:
  when it is estimated that the first lighting state is off and the second lighting state is on, output switching information to the user interface for urging the driver to switch a connection point of the switch from the second controller to the direct connecting line; and
  after outputting the switching information, execute identifying processing to identify an abnormal cause of the second system based on the first lighting state, wherein, in the identifying processing, the first controller is configured to identify that the second controller has failed or a connecting line connecting the second controller with the headlights has failed when the first lighting state is on.

2. The automated drive system according to claim 1, wherein, in the identifying processing, the first controller is configured to identify that the headlights has failed or the direct connecting line has failed when the first lighting state is off.

3. An automated drive system comprising:
a first system which is configured to execute automated driving control of a vehicle; and
a second system which is configured to control lighting operation of headlights of the vehicle,
wherein the first system comprises:
  a camera which is configured to acquire front information of the vehicle;
  a user interface which is configured to provide predetermined data to a driver of the vehicle; and
  a first controller which is configured to acquire first lighting information of the headlights based on the front information,
wherein the second system comprises:
  a second controller which is configured to output second lighting information of the headlights to the first controller, and
  a switch of the headlights, and a direct connecting line which is configured to connect the headlights and the headlight switch directly while diverting the second controller,
wherein the first controller is further configured to execute abnormality judgement processing of the second system based on the first and second lighting information,
wherein, in the abnormality judgement processing, the first controller is configured to:
  estimate a first lighting state of the headlights based on the first lighting information;
  estimate a second lighting state of the headlights based on the second lighting information; and
  if the first lighting state differs from the second lighting state, judge that an abnormality has occurred in the second system, and
wherein the first controller is further configured to:
  when it is estimated that the first lighting state is off and the second lighting state is on, output switching information to the user interface for urging the driver to switch a connection point of the switch from the second controller to the direct connecting line; and
  after outputting the switching information, execute identifying processing to identify an abnormal cause of the second system based on the first lighting state, wherein, in the identifying processing, the first controller is configured to identify that the headlights has failed or the direct connecting line has failed when the first lighting state is off.

* * * * *

UNITED STATES PATENT AND TRADEMARK OFFICE
CERTIFICATE OF CORRECTION

PATENT NO. : 10,843,627 B2
APPLICATION NO. : 16/681188
DATED : November 24, 2020
INVENTOR(S) : Kazuhiko Ueda Page 1 of 1

It is certified that error appears in the above-identified patent and that said Letters Patent is hereby corrected as shown below:

In the Specification

In Column 9, Line(s) 57, after "step", delete "10" and insert --S10--, therefor.

Signed and Sealed this
Thirteenth Day of April, 2021

Drew Hirshfeld
*Performing the Functions and Duties of the
Under Secretary of Commerce for Intellectual Property and
Director of the United States Patent and Trademark Office*